US008522557B2

(12) United States Patent
Dawson et al.

(10) Patent No.: US 8,522,557 B2
(45) Date of Patent: Sep. 3, 2013

(54) COOLING CHANNEL FOR COOLING A HOT GAS GUIDING COMPONENT

(75) Inventors: Robert W. Dawson, Oviedo, FL (US); Roland Liebe, Monheim (DE)

(73) Assignee: Siemens Aktiengesellschaft, Munich (DE)

( * ) Notice: Subject to any disclaimer, the term of this patent is extended or adjusted under 35 U.S.C. 154(b) by 1015 days.

(21) Appl. No.: 12/004,399

(22) Filed: Dec. 20, 2007

(65) Prior Publication Data

US 2009/0272124 A1 Nov. 5, 2009

Related U.S. Application Data

(60) Provisional application No. 60/876,253, filed on Dec. 21, 2006.

(51) Int. Cl.
*F02C 1/00* (2006.01)

(52) U.S. Cl.
USPC ........ 60/752

(58) Field of Classification Search
USPC ........ 60/752–760
See application file for complete search history.

(56) References Cited

U.S. PATENT DOCUMENTS

| | | | | |
|---|---|---|---|---|
| 2,664,702 | A * | 1/1954 | Shilling et al. | 60/752 |
| 3,990,837 | A * | 11/1976 | Snell | 60/752 |
| 5,363,654 | A * | 11/1994 | Lee | 60/752 |
| 5,737,915 | A * | 4/1998 | Lin et al. | 60/751 |
| 6,000,908 | A * | 12/1999 | Bunker | 416/95 |
| 6,412,268 | B1 * | 7/2002 | Cromer et al. | 60/772 |
| 6,494,044 | B1 * | 12/2002 | Bland | 60/772 |
| 6,681,578 | B1 * | 1/2004 | Bunker | 60/772 |
| 6,925,808 | B2 * | 8/2005 | Tiemann | 60/722 |
| 7,493,767 | B2 * | 2/2009 | Bunker et al. | 60/752 |
| 7,779,637 | B2 * | 8/2010 | Heilos | 60/752 |

FOREIGN PATENT DOCUMENTS

| | | |
|---|---|---|
| DE | 297 14 742 U1 | 2/1999 |
| EP | 0 928 396 B1 | 7/1999 |
| EP | 1 005 620 B1 | 6/2000 |
| EP | 1 507 116 A1 | 2/2005 |
| EP | 1 628 076 A1 | 2/2006 |
| WO | WO 98/13645 A1 | 4/1998 |

* cited by examiner

*Primary Examiner* — Ehud Gartenberg
*Assistant Examiner* — Arun Goyal

(57) ABSTRACT

The invention relates to a cooling channel for a component conveying hot gas for the purposes of conveying a coolant along a direction of flow with a downstream and an upstream side, with a plurality of inlet apertures for a coolant, with a number of inlet apertures that vary their configuration at least partly among themselves is arranged at least in one section of the cooling channel. As a result, the heat-transfer coefficient is substantially increased at points particularly requiring cooling and therefore the cooling is substantially improved. The cooling channel is characterized by a particularly low pressure loss. Furthermore, a combustion chamber with a cooling channel of this type is specified.

19 Claims, 6 Drawing Sheets

FIG 2
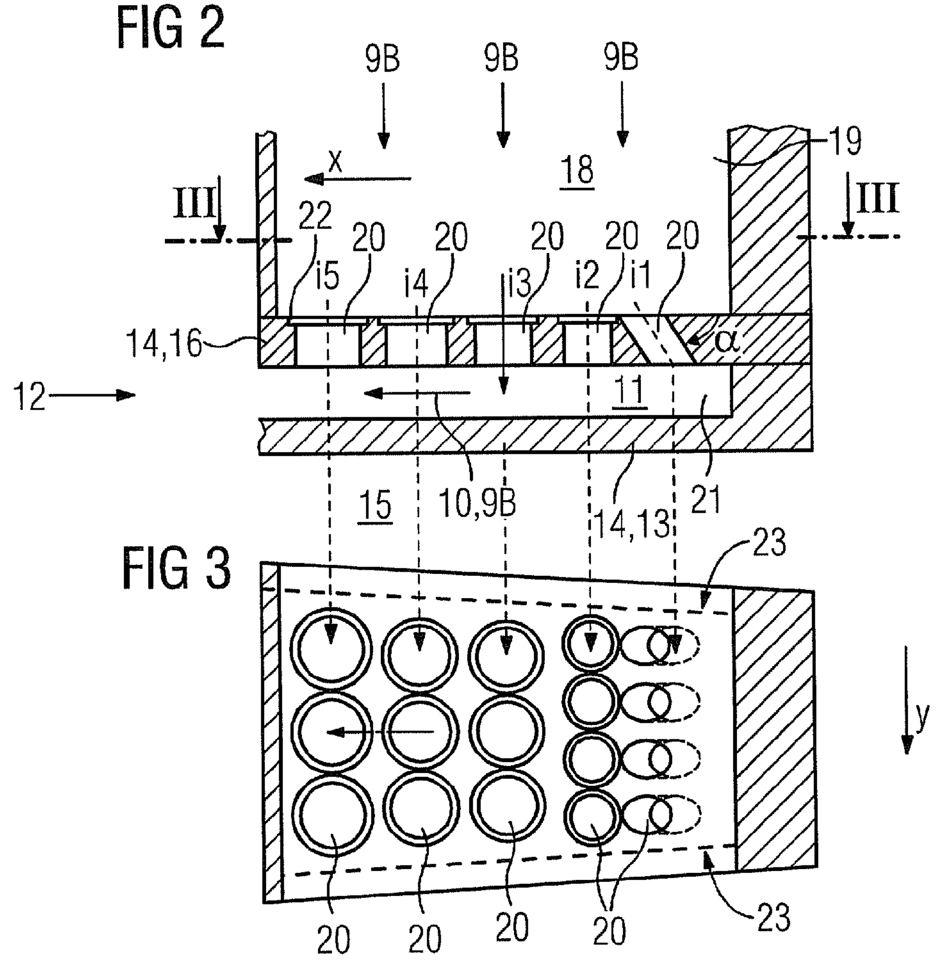
FIG 3
FIG 4
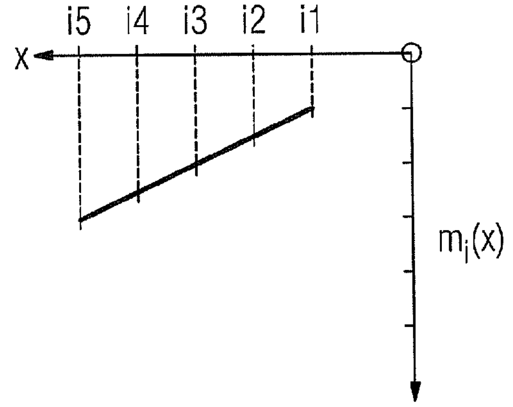

COOLING CHANNEL FOR COOLING A HOT GAS GUIDING COMPONENT

CROSS REFERENCE TO RELATED APPLICATIONS

This application claims the benefit of U.S. Provisional Application No. 60/876,253 filed Dec. 21, 2006, and is incorporated by reference herein in its entirety.

FIELD OF INVENTION

The invention relates to a cooling channel for conveying a coolant along a direction of flow.

BACKGROUND OF THE INVENTION

EP 1 507 116 A1 describes a cooling channel for example with baffle-plate cooling and also coolant flowing into the combustion chamber. The heat-shield arrangement shown surrounds the combustion chamber and comprises a plurality of heat-shield elements arranged next to each other on a support structure while leaving a gap. An internal space is formed between the heat-shield elements and the support structure, into which internal space the coolant can flow inward to cool the heat-shield elements. The coolant flows into the internal space through several inlet channels provided in the support structure, with a coolant outlet channel being provided for the controlled exit of coolant from the internal space, which coolant outlet channel opens into said gap.

In order to prevent any blowing out of coolant into the combustion chamber, more complex systems with cooling fluid recirculation are known in which the cooling fluid is conveyed in a closed circuit. Closed cooling schemes with cooling fluid recirculation of this type are described, for example, in WO 98/13645 A1, DE 297 14 742 U1, EP 1 005 620 B1, and EP 1 628 076 A1, and also in EP 0 928 396 B1.

The latter relates to a heat-shield component for a hot gas wall requiring cooling having cooling fluid recirculation and an inlet channel and an outlet channel for the cooling fluid. The inlet channel is directed toward the hot gas wall and expands in the direction of the hot gas wall. The inlet channel, the outlet channel, and the closed hot gas wall bring about complete cooling fluid recirculation so that no losses of cooling fluid whatsoever are incurred due to conveying the coolant.

EP 1 628 076 A1 describes a cooling channel with concave depressions for improved cooling, the concave depressions only being arranged outside the boundary zone on the hot gas wall, while the boundary zones remain free or are provided with turbulators. So-called dimples are arranged there for particularly effective cooling. This achieves the result that the cooling fluid is guided in the direction of the boundary zones and these are therefore cooled more. The arrangement in EP 1 628 076 A1 therefore improves the cooling of the boundary regions by the installation of turbulators. But here also, a high pressure loss is created upon the entry of the coolant into the cooling channel.

SUMMARY OF INVENTION

The object of the invention is to specify a cooling channel which is distinguished by a particularly low pressure loss and an improved cooling of a component conveying hot gas. A further object comprises the specification of a combustion chamber with a cooling channel of this type.

The object is achieved by a cooling channel as claimed in the claims. The object referring to the combustion chamber is achieved by the specification of a combustion chamber as claimed in the claims.

The invention uses the knowledge that improved cooling of the hot constructional elements in a combustion chamber is rendered possible if the cooling channel arranged thereupon exhibits a specially coordinated configuration of the cooling inlet apertures. An uneven cooling, which frequently occurs in the inflow side region of the cooling channel, in respect of the cooling channel, can namely be avoided in this way. Furthermore, the specially coordinated configuration of the cooling inlet apertures allows the heat-transfer coefficient to increase at particularly critical inlet regions and therefore ensures improved cooling. It was namely identified that most of the pressure loss occurs upon the entry of the coolant into the cooling channel, in other words upon flowing through the cooling inlet apertures. Due to this pressure loss, however, efficient cooling of particularly critical inlet regions, that is to say, for example, regions in which particularly temperature-sensitive geometries are present, is only possible to a restricted extent. To enable effective cooling, a reduction in pressure loss must therefore take place at these points. The invention has then similarly identified the fact that this reduction in pressure loss can be obtained by means of special configuration of the coolant inlet channels. It has further identified the fact that this advantageous configuration has a direct effect on the heat-transfer coefficient on the cold gas side in the region of the cooling inlet apertures. The invention thus proposes that a number of inlet apertures are arranged in a section of the cooling channel, said inlet apertures varying their configuration among themselves. Due to the invention, cooling of particularly critical inlet regions and/or components is then possible in a targeted manner and/or the formation of so-called Hot Spots is avoided in a targeted manner. Due to the invention, the "wave-shaped" distribution of the heat-transfer coefficient created, as arises in cooling channels in the prior art, is also avoided.

At least two differently configured cooling inlet apertures are provided in the cooling channel in order to introduce the coolant in a targeted manner.

In a preferred embodiment, the cooling inlet apertures exhibit differently sized, circular coolant inlet peripheries. Due to the different coolant inlet peripheries, the coolant can be directed in a targeted manner to those points at which particularly good cooling is necessary. The size and shape of the cooling inlet apertures are varied in a targeted manner for example, so that a higher mass flow of coolant can be caused to flow in to regions particularly requiring cooling in a targeted manner. The pressure loss is thus significantly reduced on the one hand, and on the other hand the heat-transfer coefficient is also markedly increased, as a result of which a substantially improved cooling takes effect. Other geometrical shapes are also conceivable.

The coolant inlet peripheries can preferably become larger in the downstream direction in the case of at least two cooling inlet apertures. A markedly increased mass flow of coolant at the downstream end of the infeed region of the coolant can thus be fed to the cooling channel than at the upstream end of the infeed region. The cooling process can thus be adjusted to the local requirements.

Alternatively, the coolant inlet peripheries can become smaller in the downstream direction in the case of the at least two cooling inlet apertures. The cooling of the upstream end of the cooling channel is primarily improved by this, since a higher mass flow of coolant is conveyed there at the upstream end of the feed-in region of the coolant.

In a preferred embodiment, the cooling channel exhibits cooling inlet apertures that are arranged in columns transversely with respect to the direction of flow and in at least two rows in the direction of flow. The configuration of the cooling inlet apertures, particularly the diameter of the circular coolant inlets, preferably varies from row to row in each case. The mass flow m(x) of the coolant can therefore be distributed on different coolant inlets in an optimum manner and conveyed to the cooling channel. Furthermore, even cooling is thus obtained over the overall expanse of the cooling channel transversely with respect to the direction of flow.

Longitudinal vortices can form in the cooling channel due to the different amounts of coolant supplied, viewed in the direction of the flow of the coolant in the cooling channel. These increase both the heat exchange and the exchange of material in the flow medium transversely with respect to the direction of flow. A reinforced cooling effect of the flow on points that are particularly under thermal stress can therefore be obtained by the targeted installation of vortex generators in the flow channel. The heat-transfer coefficient is thus increased and an optimum cooling of critical regions is thus achieved.

At least one vortex-forming and/or turbulence-forming means is preferably provided in the cooling channel. In this respect, the vortex generators should be positioned and dimensioned in such a manner that the heat-transfer coefficient referring to the pressure loss that the flow medium experiences along the system of vortex generators is as large as possible. In this way, for example, the utilization of the system of vortex generators in a gas turbine allows coolant to be saved both in the region of the combustion chamber and also in the region of the turbine vanes and therefore, while simultaneously increasing the efficiency of the gas turbine, allows its $NO_x$ emissions to be lowered.

In a preferred embodiment, the at least one vortex-forming means is arranged in the region of points particularly requiring cooling in the cooling channel for the purposes of removing heat. The at least one turbulence-forming means is similarly preferably arranged in the region of points particularly requiring cooling in the cooling channel for the purposes of removing heat. These means are arranged downstream of the inlet apertures.

In a preferred embodiment, the configuration of the inlet aperture generates a counter-rotating vortex in the region of bends in the cooling channel. This is caused by means of contorted edges in the inlet apertures, for example. Any secondary flow forming can therefore be compensated for or at least reduced. The compensation prevents a premature splitting-off of the mass flow from the side walls of the cooling channel. Alternatively or in addition, a means for generating a counter-rotating vortex is arranged in the region of bends in the cooling channel for this purpose.

The cooling channel preferably includes at least one coolant supply channel, which extends transversely with respect to the longitudinal extension of the cooling channel. This includes one inlet vane and/or at least one guide channel in a transition region between the coolant supply channel and the cooling channel. The coolant can therefore be caused to flow inward in such a targeted manner that convective cooling is realized particularly effectively in the cooling channel. Furthermore, the mass flow distribution can be adjusted in the infeed region to coolant flowing inward through the inlet apertures and the pressure loss is simultaneously reduced.

The at least one inlet vane and/or the at least one guide channel are preferably arranged between the coolant supply channel and the cooling channel, since a particularly critical region, specifically the start of the cooling channel, is located there.

The cooling channel is preferably arranged in a combustion chamber. A closed cooling system can be involved in this respect, that is to say the coolant used for cooling can subsequently take part in the combustion. It can also be an open cooling circuit, however, in which the coolant enters the combustion chamber after flowing through the cooling channel.

Further features and embodiments arise from the claims and also the description and the figures.

BRIEF DESCRIPTION OF THE DRAWINGS

The invention is explained in detail by way of example on the basis of the drawing.

The diagrams show, partly in schematic form and not to scale:

FIGS. 2,3,4 a cooling channel according to a first embodiment of the invention having cooling channel inlet apertures and also the associated mass flow distribution of the cooling channel inlet apertures, FIGS. 5,6,7 a cooling channel according to a second embodiment of the invention with cooling channel inlet apertures and also the mass flow distribution of the cooling channel inlet apertures, FIG. 8-15 a number of cooling channels according to the invention in different embodiments.

DETAILED DESCRIPTION OF INVENTION

Figure 1:
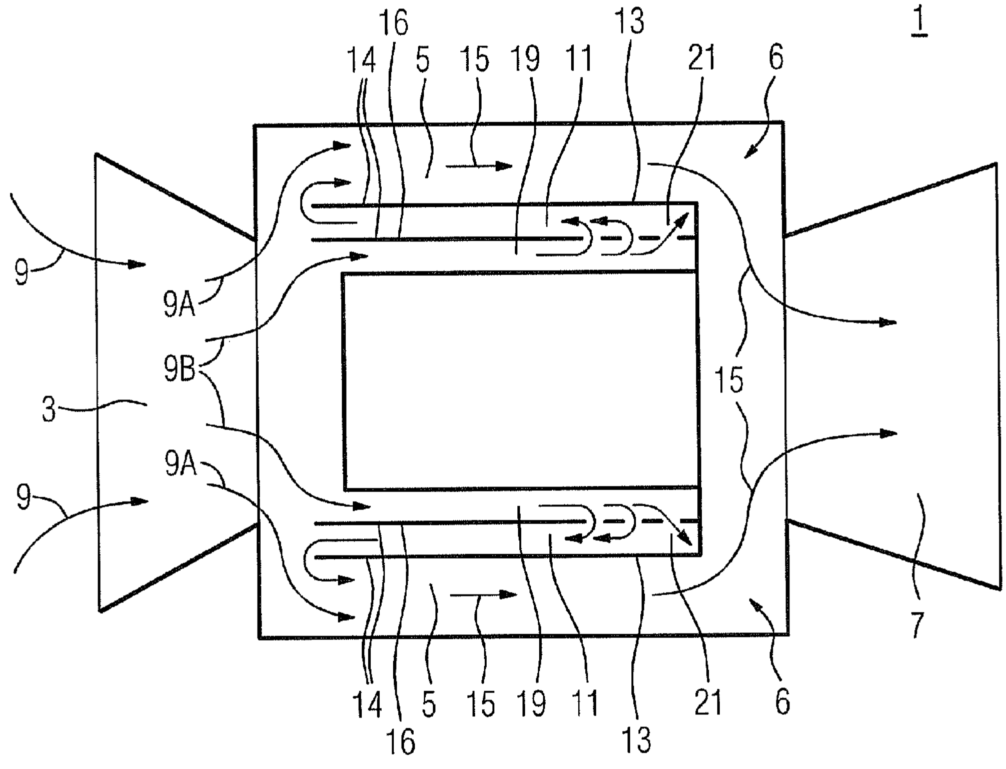
FIG. 1 a gas turbine.

FIG. 1 shows a gas turbine 1. The gas turbine 1 exhibits a compressor 3, a combustion chamber 5, and a turbine section 7. The combustion chamber 5 exhibits a combustion space 6, which is bounded by lining elements, so-called liners (not shown in detail). A cooling channel 11 is formed within these liners, which exhibit a hot gas wall 13 toward the combustion space 6 and a cold wall 16 opposite the hot gas wall 13 in each case. During the operation of the gas turbine, ambient air 9 is drawn into the compressor 3. The air, which is highly compressed in the compressor 3, is guided into the combustion space 6 of the combustion chamber 5 as combustion air 9A and combusted there with the addition of fuel to form a hot gas 15. This hot gas 15 is guided through the turbine section 7 and drives the gas turbine 1 in the process. Part of the compressed air is guided into the cooling channel 11 as coolant 9B. The cooling channel 11 exhibits coolant inlet apertures 20 for the purposes of cooling. The proportion of the coolant 9B must remain as small as possible in the case of the gas turbine 1 in order to have as much combustion air 9A as possible available for the actual combustion, particularly in the case of an open cooling scheme. This has a direct influence on the efficiency and also the nitrous oxide emission of the gas turbine 1. Coolant 9B is therefore also frequently guided back in a closed circuit and subsequently fed to the combustion as combustion air 9A. The pressure built up in the compressor 3 stores potential energy, which can also be used in principle for driving the gas turbine 1. But pressure losses in the conveying process, of the coolant 9B in particular, result in a lowering of this potential energy and therefore a lowering of the efficiency. A conveying process of the coolant 9B attended by particularly low pressure loss is therefore desirable. The cooling channel 11 exhibits a flat cross-section. In the case of closed-circuit cooling, coolant 9B flows through it at high speed. This results in high Reynolds numbers for the flow and therefore, in particular, also problems with the cooling of the side-wall regions of the flat cooling channel 11. For the purposes of improving the cooling of the side walls with simultaneous low pressure loss, the cooling channel 11 is therefore implemented as described in the following.

FIG. 2 shows a schematic cross-sectional view of a section of a combustion chamber wall 12. The cooling channel 11 extends along the combustion chamber wall 12. The cooling channel 11 is bounded by a number of channel walls 14, which are faced by two walls. One of the two walls 14 faces the hot gas 15 and the other faces a cold side 18. The two walls 14 are furthermore connected with one another, in order to bound the cooling channel 11, by means of two side walls (not shown in further detail), so that an essentially rectangular flow cross-section results for the cooling channel 11.

The cooling channel 11 has a number of cooling inlet apertures 20, which are realized as round apertures. The cooling inlet apertures 20 are furthermore distributed in an infeed region both in a row X along the direction of flow 10 of the coolant 9B as well as in a row Y, which extends transversely with respect to the direction of flow of the coolant 9B. In FIG. 2, for example, 5 rows are represented in the X direction, (i1 to i5), the start of the cooling channel being situated at i1, in other words upstream. The number of rows and the number of cooling inlet apertures 20 per row are employed as an example and are not subject to any restrictions. This also applies to the peripheries of the cooling inlet apertures. The size of the cooling inlet peripheries 22 changes row by row in each case until, from a previously defined point, they no longer change their circuit inlet peripheries 22. Cooling inlet channels 20 (row i1), which are arranged upstream, are inserted into the channel wall not facing the hot gas at a previously determined angle $\alpha$. This contributes, at the upstream-side region of the infeed region, which represents a locally thermal critical region, to increasing the heat-transfer coefficient. In addition, vortices and turbulence, which achieve improved cooling primarily in the corner regions 21, are formed in a targeted manner by means of this special design. The cooling supply channel 19 is adapted in accordance with the cooling inlet apertures 20. Thus, the cooling supply channel 19 for the cooling inlet apertures 20 is similarly installed at an angle $\beta=90°$ so that a distribution of the mass flow of coolant is produced here which is distinguished by a small pressure loss and a high heat-transfer coefficient and therefore ensures improved cooling.

FIG. 3 shows the top view of the cooling inlet apertures 20 according to section III-III from FIG. 2, as well as side walls 23. The hot gas wall 13, the cold wall 16, and the side walls 23 are joined at the upstream end by the end wall, which forms the corner regions 21 with the cold wall 16. The end wall is thus disposed immediately upstream of the aperture exits. The different supply current of coolant along the cooling channel in the direction of flow X is represented in FIG. 4. In this respect, $m_i(x)$ represents the local mass flow flowing inward into the cooling channel 11 as a function of the row i1 to i5. Thus it can be seen that the inward flow of coolant 9B increases in a linear manner in the direction X. This also allows a particularly high level of cooling to be obtained by means of a high heat-transfer coefficient on the downstream side.

Figure 5:
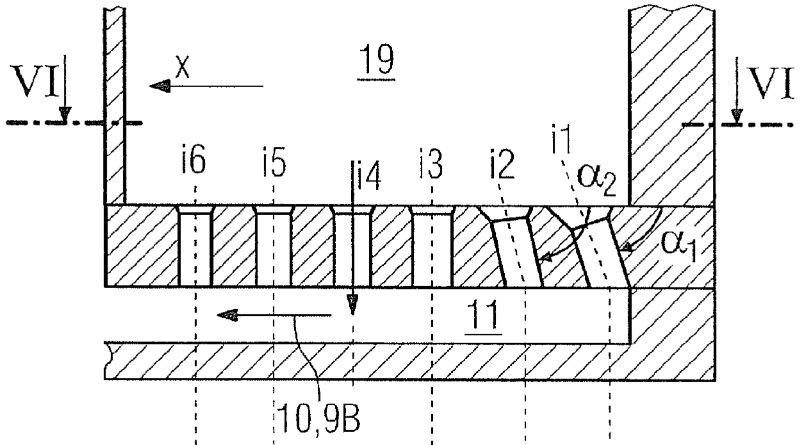
Figure 6:
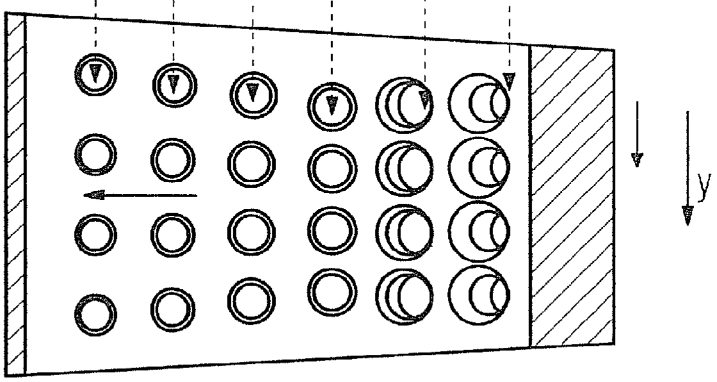
Figure 7:
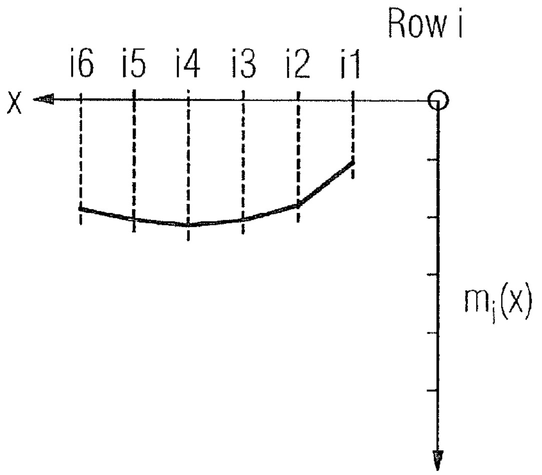

FIG. 5 shows a second embodiment of the cooling channel 11. Here, it can be seen in the first column i1 that the cooling inlet apertures 22 have been installed at an angle $\alpha_1$. The cooling inlet apertures of the column i2 are on the other hand installed at a larger angle $\alpha_2$, $\alpha_1<\alpha_2$. The cooling supply channel 19 is coordinated with the various insertion angles of the cooling inlet channels 20. An improved cooling of the cooling channel is herewith produced upstream of the infeed region. Two rows (i4, i5) with 4 cooling inlet apertures in each case are then shown, which are arranged at right angles to the cooling channel 11. After rows i4 and i5, the cooling inlet periphery 22 of the individual cooling inlet apertures 20 becomes smaller again. As a result, approximately even mass flows are obtained (FIG. 7) and therefore an even cooling of the overall cooling channel 11 and/or an even heat-transfer coefficient in the cooling channel is obtained. A wave-shaped heat transfer in the cooling channel 11 is avoided.

Figure 8:
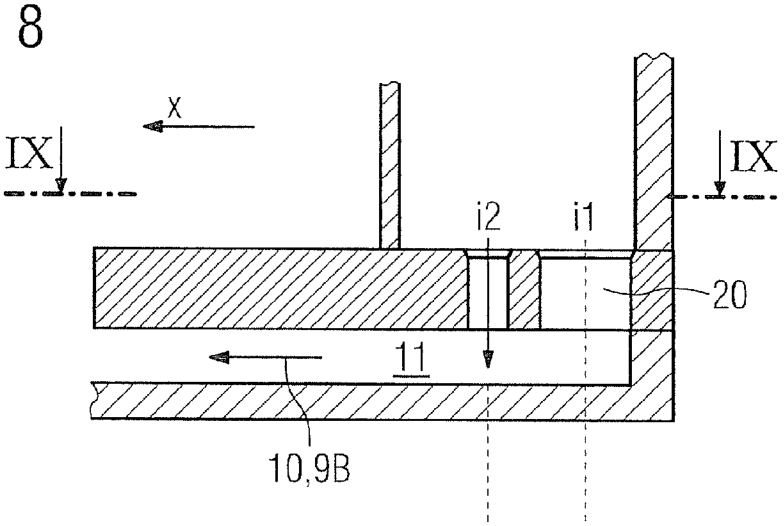
Figure 9:
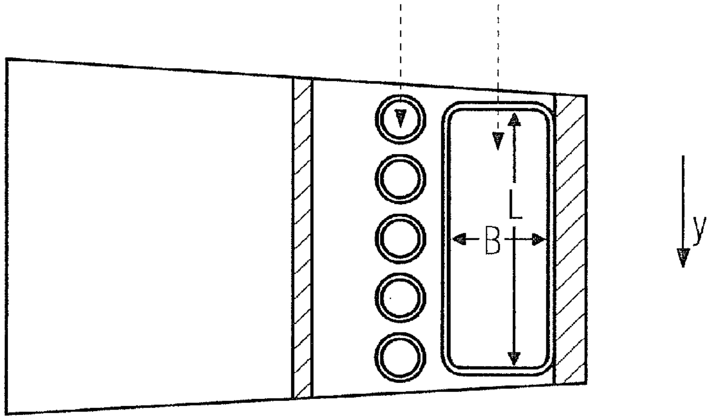
Figure 10:
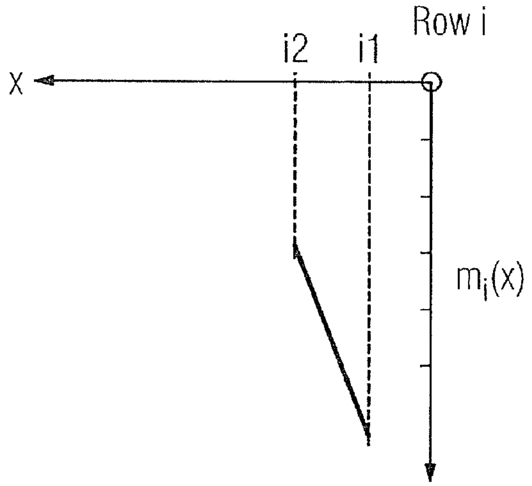

FIGS. 8 to 10 show a further embodiment of a cooling channel 11. Here, a cooling inlet aperture 20 is realized upstream at the start of the cooling channel, the length L of which cooling inlet aperture 20 is realized transversely with respect to the direction of flow over the whole flow channel, and the width B thereof in the direction of flow. The cooling supply channel is adapted to the configuration of the cooling inlet aperture 20. With the aid of this configuration, a particularly high mass flow is obtained at the start of the cooling channel and also a high heat-transfer coefficient is obtained. The size of the mass flow of the inward flowing coolant 9B significantly decreases in the direction of flow with an increasing X direction.

Figure 11:
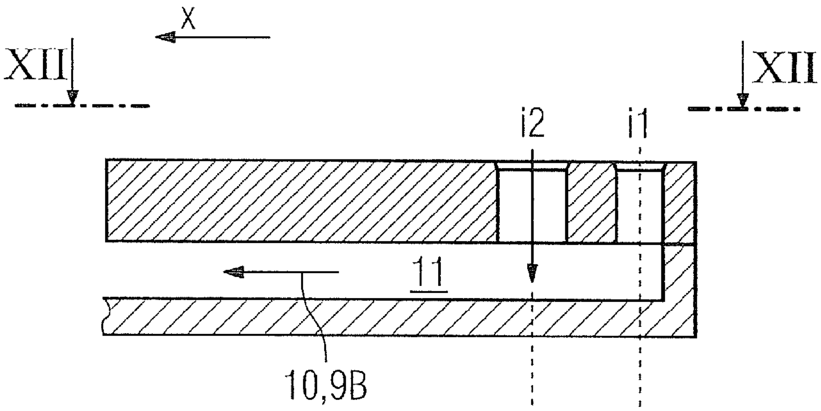
Figure 12:
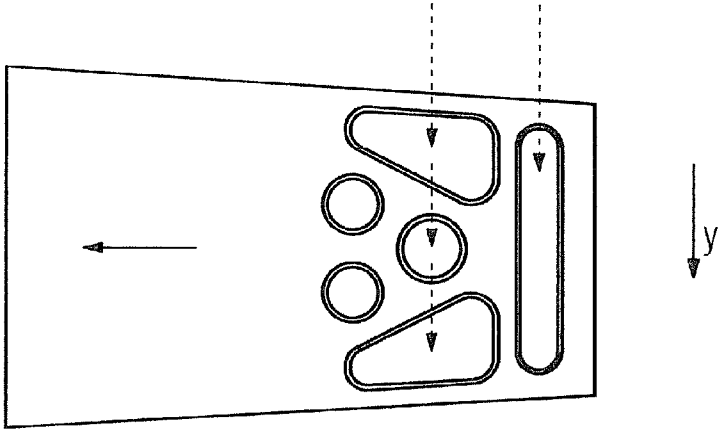
Figure 13:
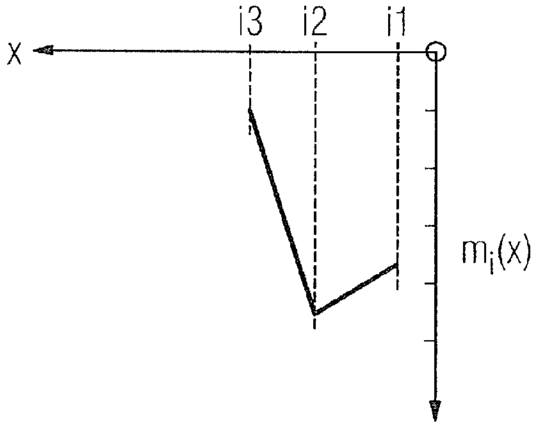

FIGS. 11 to 13 likewise show a preferred embodiment of the cooling channel 11 and also the associated mass flow distribution. Due to the approximately triangular shape of some of the inlet apertures 20 in the second row, formation of turbulence and vortices, which contribute considerably to increasing the heat-transfer coefficient, is produced here. As a result, a mass flow increase that is initially very high rises further with an increasing X direction, and then drops off strongly again.

Figure 14:
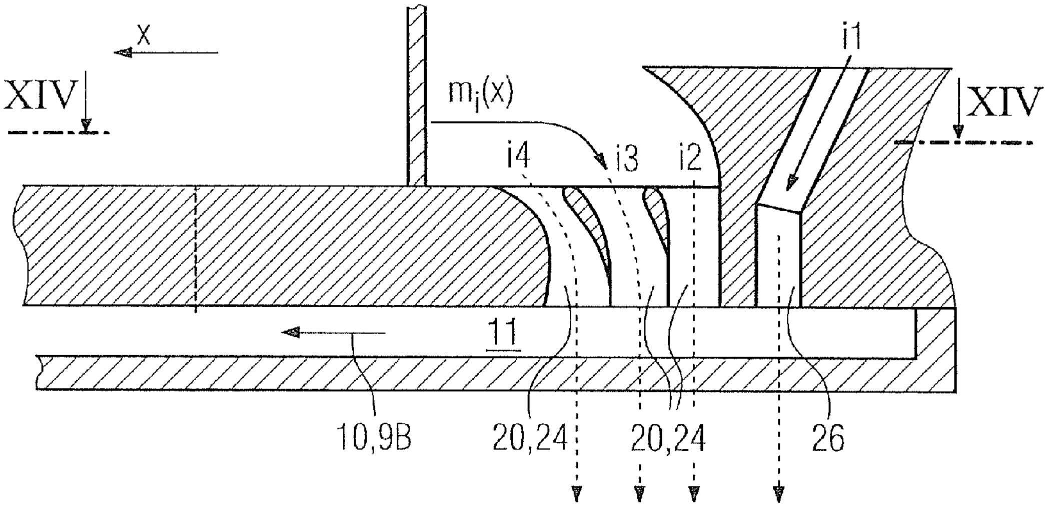
Figure 15:
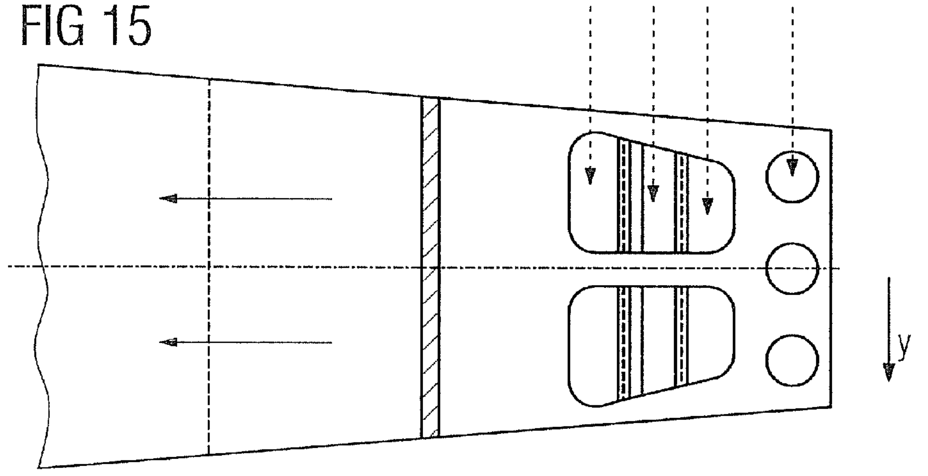

FIGS. 14 and 15 show a further embodiment of the cooling channel 11. Here, a plurality of cooling inlet channels 20 are implemented as curved guide channels 24. The guide channels 24 shown here cause coolant 9B to flow through a common coolant inlet aperture 20, which is configured correspondingly. A very small pressure loss is therefore obtained. In addition, the convective cooling is increased and the heat-transfer coefficient increased. A coolant deflector 26 curved in the opposite sense to the guide channels 24 is arranged upstream of the cooling channel 11. This is used particularly for cooling the starting region of the cooling channel 11. This embodiment overall produces a very low pressure loss and also a high heat-transfer coefficient along the cooling channel, in particularly critical regions such as the start of the cooling channel. Counter-rotating vortices/turbulence can also be generated, for the purposes of reducing secondary flow in the corner regions, by the installation of axial anti-rotation ribs. These are installed before bends in the cooling channel 11 (not shown). This can likewise be achieved by means of the configuration of the cooling inlet channels 20.

Due to the targeted configuration of the cooling inlet apertures in the infeed region of a cooling channel, the problem of the unnecessarily high pressure loss in the cooling channels in the prior art is largely avoided by using the invention, therefore, with the result that a better heat-transfer coefficient is obtained and an improved cooling of the overall cooling channel is achieved. In addition, particularly critical regions (Hot Spots and the like) can be cooled in an improved manner. To this end, vortices and turbulence can be generated in the cooling channel with the aid of the configuration of the coolant inlet apertures. A wave-shaped distribution of the heat-transfer coefficient and therefore of the hot gas wall temperature is avoided with the invention. The pressure loss between inward flowing and outward flowing coolant is substantially improved.

The invention claimed is:

1. A cooling channel for conveying a coolant along a direction of flow, comprising:

a plurality of channel walls having a downstream and an upstream side with respect to the direction of coolant flow where a first channel wall is operatively exposed to a hot combustion gas, a second channel wall is disposed opposite the first channel wall, and side walls, each spanning from the first channel wall to the second channel wall; and a plurality of inlet apertures arranged in a plurality of rows around the perimeter of at least the second channel wall for the inlet of the coolant to the cooling channel at the upstream side, wherein the plurality of rows are arranged in the direction of flow, wherein the plurality of inlet apertures are axially aligned with the cooling channel and radially outward of the first channel wall, wherein the inlet apertures vary in size and/or shape among themselves, wherein each inlet aperture comprises an aperture entry and an aperture exit, and wherein at the upstream side the cooling channel terminates at an end wall disposed upstream of the aperture exits and joining the first channel wall, the second channel wall, and the side walls such that the inlet apertures supply all coolant for the coolant flow in the cooling channel.

2. The cooling channel as claimed in claim 1, wherein the configuration of the inlet apertures includes at least one geometry of the inlet apertures.

3. The cooling channel as claimed in claim 1, wherein the configuration of each of the inlet apertures includes a circular coolant inlet periphery and/or another geometrical shape.

4. The cooling channel as claimed in claim 1, wherein a plurality of the cooling inlet apertures comprise different coolant inlet peripheries.

5. The cooling channel as claimed in claim 4, wherein the coolant inlet periphery of the cooling inlet apertures arranged downstream is larger than the coolant inlet periphery of the cooling inlet apertures arranged upstream.

6. The cooling channel as claimed in claim 4, wherein the coolant inlet periphery of the cooling inlet apertures arranged downstream is smaller than the coolant inlet periphery of the cooling inlet apertures arranged upstream.

7. The cooling channel as claimed in claim 4, wherein the cooling inlet apertures are arranged in columns transversely with respect to the direction of flow and in a plurality of rows in the direction of flow.

8. The cooling channel as claimed in claim 7, wherein the coolant inlet periphery of the cooling inlet apertures varies from column to column in each case.

9. The cooling channel as claimed in claim 1, wherein at least one vortex-forming and/or turbulence-forming device is arranged in the cooling channel for removing heat from the channel wall arranged on the hot combustion gas side.

10. The cooling channel as claimed in claim 9, wherein the vortex-forming or as applicable turbulence-forming device is arranged in the region of points particularly requiring cooling in the cooling channel.

11. The cooling channel as claimed in claim 10, wherein the channel wall of the cooling channel facing the hot combustion gas comprises concave depressions exposed to the coolant.

12. The cooling channel as claimed in claim 11, wherein the configuration of the inlet aperture generates a counter-rotating vortex in the region of the depressions in the cooling channel.

13. The cooling channel as claimed in claim 1, wherein at least one inlet aperture is defined at least in part by an inlet vane.

14. The cooling channel as claimed in claim 13, wherein the inlet vane is arranged upstream of the cooling channel.

15. The cooling channel as claimed in claim 1, wherein at least one of the inlet apertures is angled to direct a portion of the flow into a corner region at an upstream most end of the cooling channel.

16. The cooling channel as claimed in claim 1, wherein the inlet apertures are effective to reduce a secondary flow within the flow and proximate the side walls.

17. A cooled combustion chamber, comprising:

a combustion space arranged within the combustion chamber;

a burner arranged within the combustion space that admits a fuel to be combusted in the combustion space to produce a hot combustion gas; and a cooling channel arranged within the combustion chamber that defines the combustion space and having:

a plurality of channel walls having a downstream and an upstream side with respect to the direction of coolant flow where a first channel wall is operatively exposed to the hot combustion gas, a second channel wall is disposed opposite the first channel wall, and side walls, each spanning from the first channel wall to the second channel wall; and a plurality of inlet apertures arranged in a plurality of rows around the perimeter of at least the second channel wall for the inlet of the coolant to the cooling channel at the upstream side, wherein the plurality of rows are arranged in the direction of flow, wherein the plurality of inlet apertures are axially aligned with the cooling channel and radially outward of the first channel wall, wherein the inlet apertures vary in size and/or shape among themselves within at least one segment of the cooling channel, wherein the inlet apertures are effective to reduce a secondary flow within the flow and proximate the side walls, wherein each inlet aperture comprises an aperture entry and an aperture exit, and wherein at the upstream side the cooling channel terminates at an end wall disposed upstream of the aperture exits and joining the first channel wall, the second channel wall, and the side walls such that the inlet apertures supply all coolant for the coolant flow in the cooling channel.

18. A gas turbine engine, comprising:

a rotor arranged along a rotational axis of the turbine;

a compressor arranged coaxially with the rotor that inlets a working fluid and produces a compressed working fluid;

a combustion chamber arranged downstream of the compressor that receives the compressed working fluid and comprises:

a combustion space arranged within the combustion chamber, a burner arranged within the combustion space that admits a fuel to be combusted in the combustion space to produce a hot combustion gas, and a cooling channel arranged within the combustion chamber that defines the combustion space and having:

a plurality of channel walls having a downstream and an upstream side with respect to the direction of coolant flow where a first channel wall is operatively exposed to the hot combustion gas, a second channel wall is disposed opposite the first channel wall, and side walls each spanning from the first channel wall to the second channel wall; and a plurality of inlet apertures arranged in a plurality of rows around the perimeter of at least the second channel wall for the inlet of the coolant to the cooling channel at the upstream side, wherein the plurality of rows are arranged in the direction of flow, wherein the plurality of inlet apertures are axially aligned with the cooling channel and radially outward of the first channel wall, wherein the inlet apertures vary in size and/or shape among themselves within at least one segment of the cooling channel, wherein the inlet apertures are effective to reduce a secondary flow within the flow and proximate the side walls, wherein each inlet aperture comprises an aperture entry and an aperture exit, and wherein at the upstream side the cooling channel terminates at an end wall disposed upstream of the aperture exits and joining the first channel wall, the second channel wall, and the side walls such that the inlet apertures supply all coolant for the coolant flow in the cooling channel a turbine arranged downstream of the combustion chamber that receives and expands the hot combustion gas to produce mechanical energy.

19. The gas turbine engine as claimed in claim 18, wherein two opposite channel walls extend along the direction of flow and between which a cooling channel headspace extending transversely with respect to the direction of flow is present, and one of the two channel walls faces a hot side and the other of the two channel walls faces a cold side.

* * * * *